Figure 1:
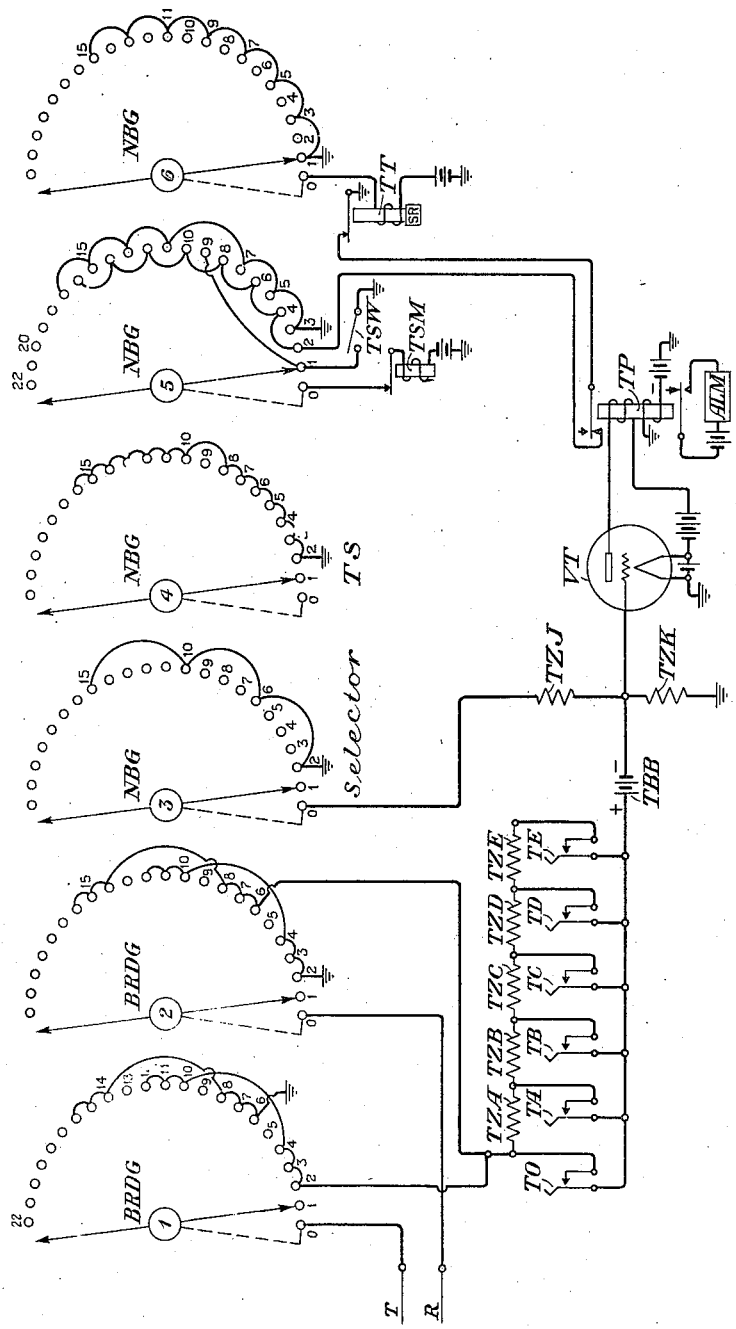

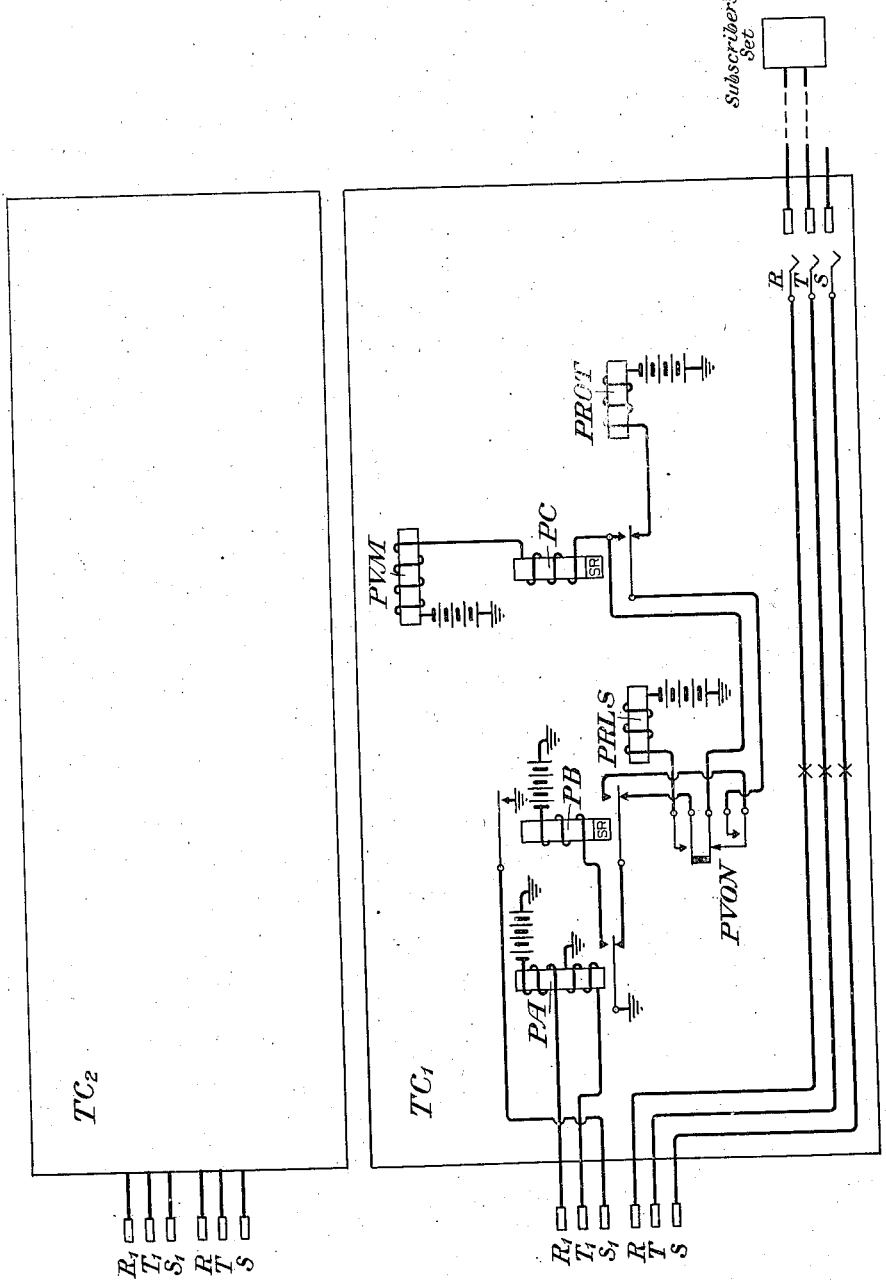

Patented Jan. 22, 1946

2,393,236

UNITED STATES PATENT OFFICE 2,393,236

SUBSCRIBERS' LINE TESTING SYSTEM

Horace Edmund Corey, Denville, and Frank Wright, Trenton, N. J., assignors to American Telephone and Telegraph Company, a corporation of New York Application September 15, 1944, Serial No. 554,194

18 Claims. (Cl. 179—175.11)

This invention relates to testing systems and more particularly to apparatus for testing subscribers' lines in telephone systems. Still more particularly, this invention relates to apparatus for performing routine tests on subscribers' line circuits in order to detect incipient troubles of such magnitude as to adversely affect service, as well as to detect actual trouble conditions.

In central offices employing automatic dial control switching apparatus, it is important to make periodic tests of the subscribers' lines so as to determine whether satisfactory service can be given over the lines. Such tests have heretofore been performed by attendants equipped with testing apparatus which would be manually switched from one subscribers' line to another. The attendants would test each line to determine whether the line is busy and then if the line is found idle, they would proceed to measure the insulation resistance between each conductor of the line and ground as well as the insulation resistance between both conductors of the line. Such manual tests naturally consume a great deal of time and are therefore quite costly.

It is therefore an object of this invention to provide an automatic testing apparatus which may progressively test many subscribers' lines in a brief interval of time and at the same time supply a visual indication of the number of each line being tested at any moment.

Another object of this invention is to provide such automatic testing apparatus with means for determining whether any of the subscribers' lines are busy and for passing such lines, while all non-busy lines will be tested by the apparatus of the invention.

Another object of this invention is to provide the automatic testing apparatus with means which will be responsive to a faulty subscriber's line condition to cause the automatic testing apparatus to cease making any further routine tests on other subscribers' lines. This will enable the attendant to make an individual test of the faulty line after its number has been noted and recorded and then to correct the faulty condition if so desired.

Another object of the invention is to provide the automatic testing apparatus with means for testing the various subscribers' lines for any predetermined insulation resistance merely by operating any one of a plurality of switches each of which corresponds to a different value of insulation resistance for test purposes. It is an object of the invention to set the automatic testing apparatus to perform the routine tests at any assigned value of insulation resistance without requiring further adjustments of the testing apparatus before the tests may proceed. The control of the value of the insulation resistance to be measured by the automatic testing apparatus enables the attendant to take into account different conditions of weather or temperature or any other factors that may change from time to time and may therefore influence the tests.

This invention will be better understood from the more detailed description hereinafter following when read in connection with the accompanying drawings, in which Figure 1 illustrates certain of the important components of the automatic testing apparatus employed for testing any one of a plurality of lines, and Figs. 2, 3, 4 and 5 together comprise a detailed arrangement which may be embodied in automatic testing apparatus for progressively testing the various lines.

Referring to Fig. 1 of the drawings, one of the lines to be tested includes two conductors designated T and R which, it may be assumed, has been previously tested and found idle and from which the central office battery (not shown) has been removed for the time required to perform the subsequent tests. The arrangement includes a step-by-step selector TS of the rotary type having six arcs, the first two of which, marked BRDG, include movable brushes of the "bridging" type, while the other four, designated NBG, include movable brushes of the "non-bridging" type. The control or stepping magnet of the selector TS is designated TSM. A vacuum tube VT which may be of any well-known type, is illustrated to include three electrodes, namely, a cathode, a control grid and an anode. The control grid is connected to ground through a comparatively large resistor TZK. The control grid is also connected to the negative terminal of the battery TBB, the positive terminal of which is connected in common to the swingers of a plurality of switches designated TO, TA, TB, TC, TD and TE. The switches TA . . . TE correspond to and control the connection of the resistors TZA . . . TZE, respectively, to the circuit. The contact of the switch TO is wired to terminal No. 2 of arc 1 of the selector TS which, as will be shown later, may be connected to one of the conductors, such as T, of the line to be tested. The control grid of the tube VT is also connected through a resistor TZJ to terminal No. 0 of arc 3 of selector TS. This resistor is of a comparatively small magnitude and may be employed to ground the control grid of the tube VT as will be explained. A relay TP is associated with the anode-cathode electrodes of the tube VT. This relay has two windings, the upper of which is included, along with the usual plate battery, in the circuit of the anode and cathode of the tube VT. The lower winding of the relay TP is connected in series with a battery and supplies biasing current continually to this winding of the relay. The magnetic effects of these two windings are in opposed relation to each other, the lower tending to release the relay while the upper winding tends to operate the relay or hold it operated.

The upper armature and the make contact of relay TP are connected between the contact No. 2 of arc 5 of the selector TS and the back contact of the armature of relay TT. The winding of relay TT is wired to terminal No. 0 of arc 6 of the selector TS and it is normally operated over a circuit which includes battery, the winding of relay TT, the feeder brush and main brush of arc 6 of the selector TS and ground at terminal No. 1 of this same arc. The relay TT is of the slow release type and acts as a timing device for timing the advance of the selector TS. By so timing the circuit it is possible to control the magnitudes of voltage of battery TBB, for example, which may be applied to the conductors of the line to be tested, as will be explained.

After the line having conductors T and R has been seized, the automatic equipment will act to close a switch such as TSW for starting the routine tests of the insulation resistance of the line. The magnet TSM will then become energized over a circuit including battery, the winding of the magnet TSM, contact No. 0 of arc 5 of the selector TS, the feeder and main brushes and contact No. 1 of this selector, switch TSW and ground. As soon as the magnet TSM becomes energized, it attracts its armature and thereby opens its back contact, whereupon the selector TS will move all of the main brushes on its six arcs simultaneously to their respective contacts No. 2. Immediately after the main brush of arc 6 of the selector leaves its contact No. 1, the winding of relay TT will become de-energized but the latter relay will become fully released a predetermined interval of time thereafter due to its slow release property. At the same time the control grid of the tube VT will become practically grounded over a circuit completed through resistor TZJ and the feeder brush and main brush of arc 3 and its contact No. 2 and ground. By so grounding the control grid of the tube VT, a substantial current will traverse the upper winding of relay TP so as to hold the relay operated. Furthermore, the battery TBB will be connected in a circuit which includes the conductor T of the line and the resistor TZK, as will now be explained, this circuit causing current to traverse resistor TZK of a magnitude which varies inversely with the insulation resistance of the conductor T. The application of battery TBB to the line will condition the line by bringing the tip conductor T to a predetermined voltage with respect to the ring conductor R.

The resistors TZA, TZB, TZC, TZD and TZE may be equal resistors of, for example, 50,000 ohms each. By closing switch TA the corresponding resistor TZA will be connected between the positive terminal of battery TB and conductor T of the line through terminal No. 2 and the main and feeder brushes of arc 1 of the selector SE. If the switch TB were closed instead of switch TA, then both resistors TZA and TZB would be interposed in series with each other in the path between the positive terminal of battery TB and conductor T of the line. Hence by closing any one of the switches TA to TE, it is possible to interpose any desired magnitude of resistance, as, for example, any resistance up to 250,000 ohms, in series between the battery TBB and conductor T of the line. On the other hand, all of these resistors may be shunted out of the circuit merely by operating switch TO, in which case the positive terminal of battery TBB will be connected to the conductor T of the line through the brushes of arc 1 of the selector.

Thus it is possible to interpose any desired amount of resistance into the circuit which includes conductor T of the line, battery TBB and resistor TZK. If the line is to be tested for an insulation resistance to ground of 300,000 ohms, for example, the switch TO will be closed to shunt the resistors TZO to TZA out of the circuit and in this case, if the insulation resistance to ground exceeds the predetermined value of 300,000 ohms assumed in the illustration, a flow of current from the battery TBB through the previously described circuit which includes resistor TZK will be so small as to render the voltage applied to the grid of the tube VT at a very small negative potential with respect to the cathode. This is because the voltage applied to the grid of tube VT is governed by the voltage across resistor TZK and the voltage across resistor TZK is governed by the flow of current from battery TBB through both resistor TZK and the insulation resistance of conductor T. Consequently, an appreciable current will flow through the upper winding of relay TP when the insulation resistance exceeds the above mentioned predetermined value and the relay will therefore be held operated. On the other hand, should the insulation resistance to ground be found lower than the predetermined value of 300,000 ohms, a greater current will flow through the series circuit including battery TBB and resistor TZK, and therefore the negative voltage applied to the control grid of the tube VT will be of a higher value. The current now traversing the upper winding of relay TP will be reduced substantially below its previous value, and hence relay TP will be released. The release of relay TP will act to stop the selector TS as will be explained later.

As already stated hereinabove, when the selector TS is on its contact No. 2, the grid of tube VT is practically grounded and current then begins to flow from battery TBB to the conductor T of the line to be tested for its insulation resistance. Simultaneously the line conductor R will be grounded through the brushes of arc 2 and its terminal No. 2. After sufficient time interval has elapsed, relay TT will release so as to complete the circuit controlling the magnet TSM of the selector TS. The energizing circuit for the magnet includes the grounded armature and back contact of relay TT, the upper armature and make contact of relay TP, contact No. 2 and the brushes of arc 5 of the selector, the contacts and winding of magnet TSM, battery and ground. When the magnet TSM is again energized, it will cause its armature to open its back contact, thereby causing the selector TS to step to its contact No. 3. At contact No. 3 the relay TT will again become energized over a circuit including battery, the winding of the relay TT, the brushes of arc 6 of the selector TS, contacts Nos. 3 and 1 of this same arc which are connected to each other, and ground.

When the selector TS advances from its terminal No. 2, the ground previously applied through resistor TZJ to the control grid of the tube VT will be removed. When the selector TS is advanced to its terminal No. 3, the battery TBB and the resistor TZK will remain connected to conductor T of the line over the path provided by the brushes of arc 1 of the selector and its terminals Nos. 3 and 2 which are connected to each other, and switch TO which may be assumed to be closed for this illustration. Similarly, the conductor R of the line will remain grounded through the brushes of arc 2 and its terminals Nos. 3 and 2. While the selector TS remains on its terminal No. 3 current will continue to flow from the battery TBB to conductor T over the series circuit already outlined. At the same time the magnet TSM will again be energized, the magnet being connected to ground at contact No. 3 of arc 5 of the selector through the brushes of that arc. The opening of the contact of magnet TSM in response to its operation will now advance the selector TS to its terminal No. 4. The winding of the slow release relay TT will therefore become deenergized, but before its armature closes its back contact, the battery TBB and resistor TZK will remain connected to the conductor T of the line to be tested and, moreover, the conductor R of the line will remain grounded.

If the insulation resistance of the conductor T is less than the value fixed for the test, the relay TP will become released, as already explained. The release of the relay TP will break the circuit extending through the winding of magnet TSM and thereby prevent the selector TS from making any further steps even when relay TT releases. The release of relay TP will result in the operation of the alarm ALM for notifying the attendant that the line being tested is in faulty condition.

Should there be a short circuit between conductors T and R of the line to be tested, an appreciable current will also flow through resistor TZK over the circuit including ground at the contacts Nos. 2, 3 and 4 of arc 2 of the selector TS and the brushes of that arc, the conductors R and T which are short circuited to each other, the brushes of arc 1 of the selector and contacts Nos. 4, 3 and 2 which are connected to each other, switch TO, battery TBB, resistor TZK and ground. This current through resistor TZK will again render the control grid of tube VT at a substantially negative voltage with respect to its cathode, thereby causing relay TP to release. This condition will also operate the alarm ALM and at the same time stop the selector TS.

Should there be an accidental cross-connection of battery to the tip conductor T of the line to be tested, the negative voltage then applied to the conductor T will be added to the negative voltage of battery TBB to increase the flow of current through resistor TZK. The circuit now will include, in addition to resistor TZK, battery TBB, switch TO, the brushes of arc 1 of the selector and conductor T, to which battery has been cross-connected. Again the negative voltage applied to the grid of the tube VT by the flow of current through resistor TZK will be sufficient to release relay TP. Thus relay TP will be released if, while the selector TS moves between contacts Nos. 3 and 4, the insulation resistance of the conductor T is below the predetermined value for which the apparatus is set to make a test, or if there is a short circuit between the line conductors T and R, or if a foreign battery has been cross-connected to the tip conductor T. In the absence of any such faulty conditions, the relay TP will remain operated and will enable the selector TS to advance to its next terminal. It is to be observed that the cross-connected voltage will generally be negative, as already noted, because the central office battery usually has its positive terminal grounded.

Should there be no faulty condition associated with the tip conductor T of the line, the magnet TSM will again be energized and a circuit completed from the grounded armature of relay TT and its back contact, the armature and make contact of relay TP, terminals Nos. 2 and 4 of arc 5 of the selector and its brushes, the contacts and winding of magnet TSM, battery and ground. The energization of this magnet will advance the selector TS to its next terminal No. 5. Terminal No. 5 of arc 1 is an open terminal and hence the conductor T of the line will be disconnected from the battery TBB and resistor TZK. Terminal No. 5 of arc 2 of this selector is likewise an open terminal and hence the ring conductor R of the line will be ungrounded. However, the magnet TSM will become reenergized over a circuit completed through contacts Nos. 5 and 3 of arc 5 of the selector TS which are connected to each other, and to ground. This will advance the selector to its terminal No. 6.

At terminal No. 6 of arc 1 of the selector TS, ground will now be applied to the conductor T of the line through the brushes of arc 1 of the selector. The conductor R of the line will now be connected to battery TBB and resistor TZK over a circuit which includes resistor TZK, battery TBB, switch TO, the brushes of arc 2 of the selector and its terminal No. 6, and conductor R of the line. The selector TS will take the same steps for conductor R as those already described for conductor T and relay TP will remain operated either if the insulation resistance to ground of the conductor R is greater than the predetermined value, or if there is no foreign voltage applied to the conductor R. On the other hand, the presence of one of these faulty conditions will cause relay TP to release and thereby interrupt any further stepping by the selector TS.

The circuit of Fig. 1 has been described with switch TO closed and resistors TZA, TZB, TZC, TZD and TZE therefore shunted out of the circuit. If the line conductors T and R are to be tested for a lower insulation resistance as, for example, 250,000 ohms, then switch TA will be operated instead of switch TO. This will include resistor TZA in series with battery TBB and resistor TZK and hence relay TP will release only if the insulation resistance is below the predetermined value of 250,000 ohms. The vacuum tube system and relay TP and the remainder of the testing apparatus will require no adjustments for testing lines at this lower value. For testing at a still lower insulation resistance, of 200,000 ohms, for example, switch TB will obviously be operated, all other switches remaining unoperated. Then resistors TZA and TZB will be connected in series with each other in the testing circuit. Similarly, if switch TE is operated to the exclusion of all other switches, all resistors TZA . . . TZE will be included in the series circuit and hence relay TP will release if the insulation resistance is below a value of, for example, 50,000 ohms. The circuit arrangement is free of any adjustments for changes in the values of the testing conditions and this is one of the features of the invention.

Figure 2:
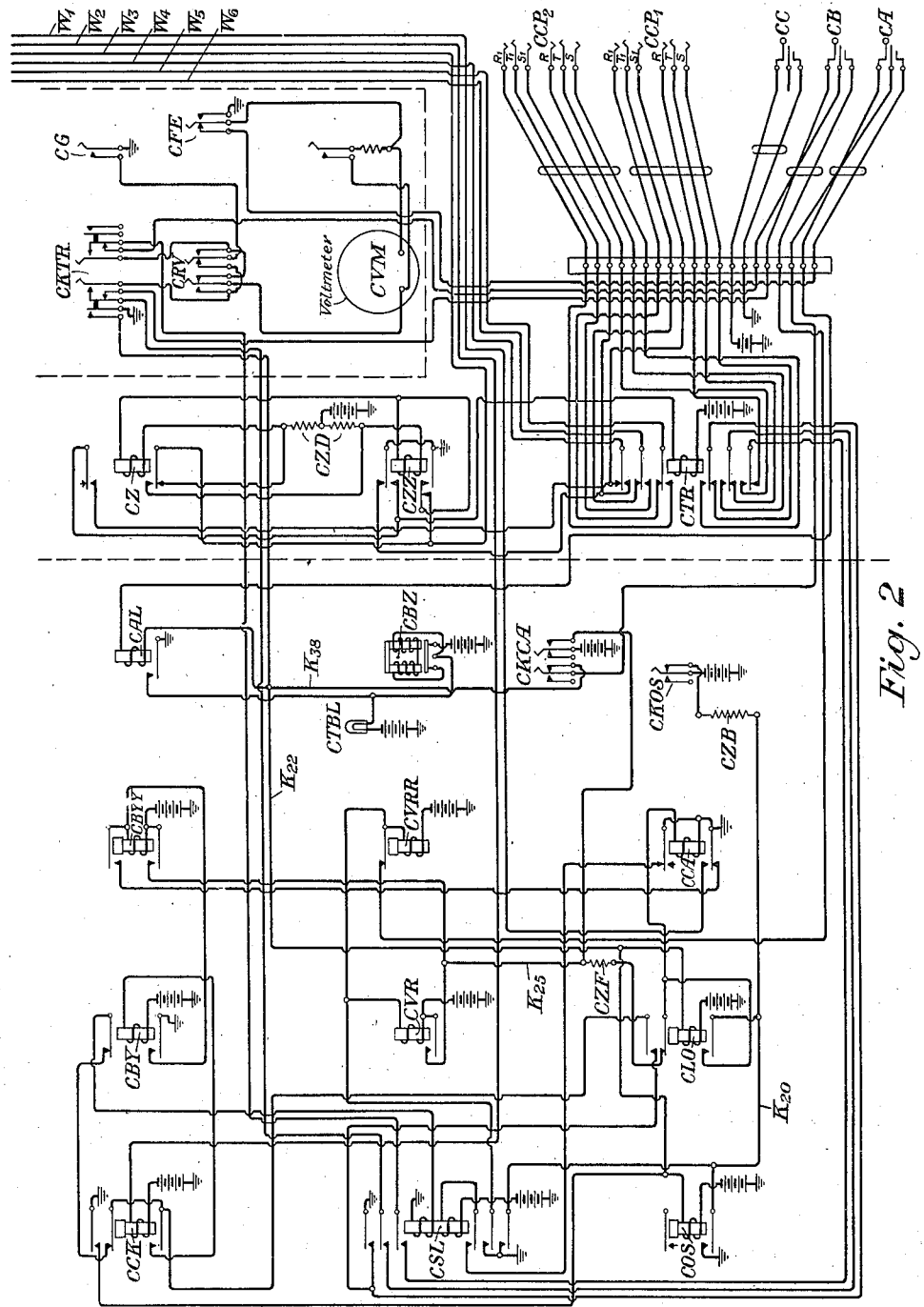

Figs. 2, 3, 4 and 5 together comprise substantially all of the testing equipment of the invention. Fig. 2 shows part of the testing apparatus and it includes plugs CCP$_1$ and CCP$_2$ which may be connected to two test connectors such as TC$_1$ and TC$_2$, respectively, which are shown in Fig. 5. Each test connector of Fig. 5 serves to gain access to any one of a hundred subscribers' lines;

for example. The conductors $W_1$, $W_2$ ... $W_6$ of Fig. 2 are wired to the conductors of Fig. 3 bearing the same designations. Also, the plugs CA, CB and CC of Fig. 2 engage the jacks TA, TB and TC of Fig. 4.

Figure 3:
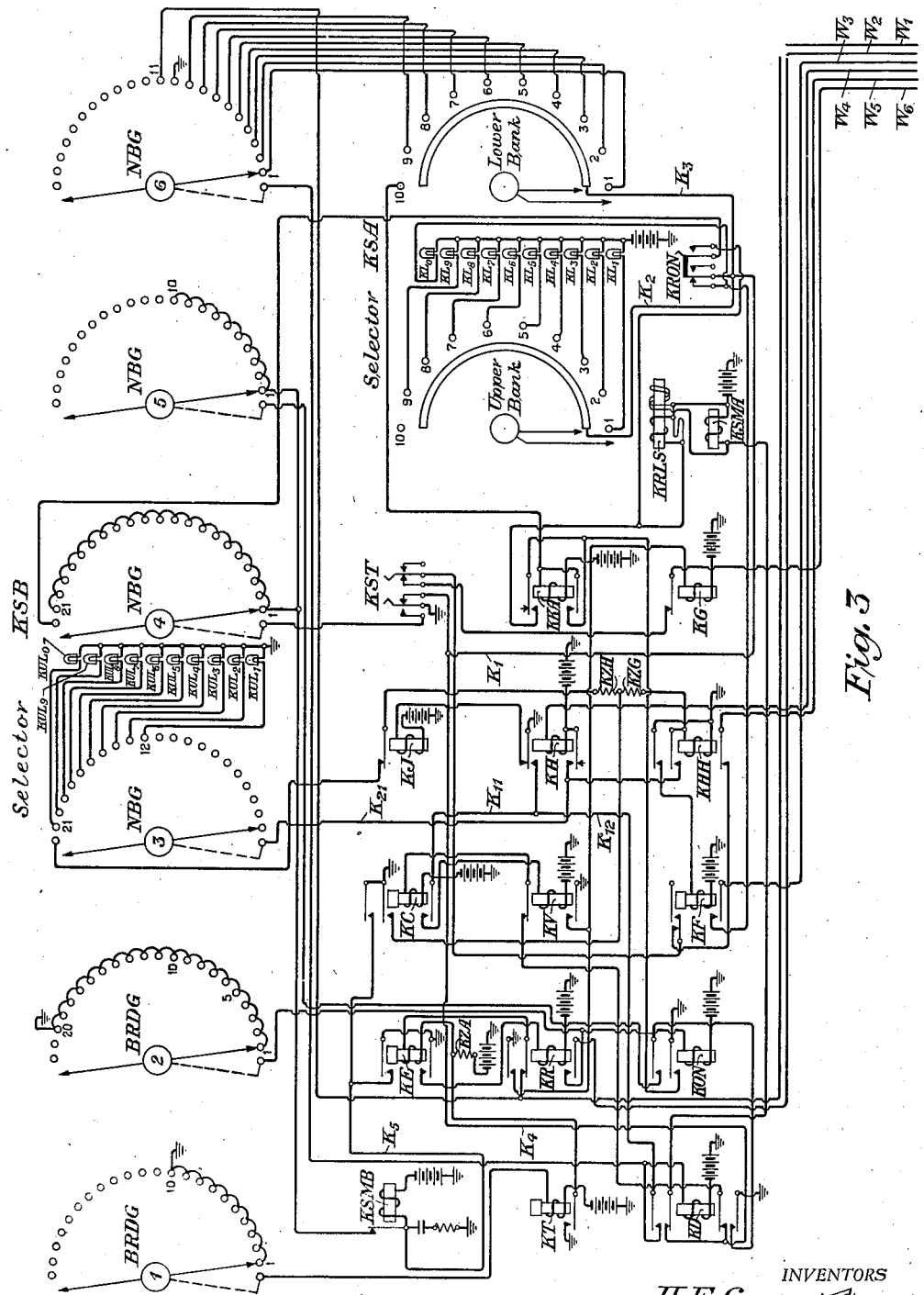

The relay KJ of Fig. 3 is normally operated over a circuit which includes battery, the winding of relay KJ, the back contact and upper armature of relay KH and ground. Ground is applied to the upper and lower solid bank segments of the selector KSA of Fig. 3 which, together with the selector KSB of this figure, are utilized to select any one of the various subscribers' circuits connected to one of the test connectors such as $TC_1$ of Fig. 5, as will be explained. The ground extends from the left swinger and normal contact of key KST, over conductor $K_1$ and then over two parallel paths one of which traverses conductor $K_2$ to the upper solid bank segment of selector KSA and the other path traverses conductor $K_3$ to the lower solid bank segment of selector KSA. The relay KC will be operated over a circuit which includes battery and the winding of relay KC, the upper armature and back contact of relay KV, the lower inner armature and back contact of relay KD, conductor $K_4$ and the normal contact and left swinger of key KST which is grounded. The stepping magnet KSMA which controls the selector KSA will be energized over a circuit which includes battery, the winding of the magnet KSMA, the upper inner armature and back contact of relay KD, conductor $K_4$ and the normal contact and left swinger of key KST which is grounded. The operation of the stepping magnet KSMA will advance the selector KSA to its terminal No. 1. On terminal No. 1 the lamp $KL_1$ will be illuminated, the circuit controlling the lamp including battery, lamp $KL_1$ and terminal No. 1 associated with the upper bank of selector KSA, the brushes of the upper bank of this selector, then over conductors $K_2$ and $K_1$ to the back contact and left swinger of key KST which is grounded. The operation of relay KC also causes the energization of the starting magnet KSMB which controls the selector KSB, the energizing circuit including ground at the outer upper armature and make contact of relay KC, conductor $K_5$, the winding of the stepping magnet KSMB and battery. The operation of relay C also places a shunt around the winding of relay KHH. It will be observed that the lower terminal of the winding of relay KHH is grounded, while its upper terminal is now connected to ground through resistor KZG and the upper inner make contact and armature of relay KC. The operation of relay KC also partially completes a path for the operation of relay KV, the upper terminal of the winding of relay KV being connected to the lower make contact and armature of relay KC, but relay KV will be operated thereafter upon the operation of relay KH, as will be explained.

The right swinger and normal contact of key KST complete a so-called pulsing circuit extending to the tip and ring terminals $T_1$ and $R_1$ of the test connector $TC_1$ of Fig. 5 to operate the relay PA of the test connector. The circuit may be traced from battery and the upper winding of relay PA of the test connector $TC_1$ (Fig. 5) to the ring terminal $R_1$ and its corresponding terminal of the plug $CCP_1$ of Fig. 2, the back contact of the innermost upper armature of the relay CTR, conductor $W_5$, the lower armature and back contact of relay KHH (Fig. 3), the make-before-break contact of relay KF, the right swinger and normal contact of key KST, the back contact and armature of relay KG, conductor $W_6$, the second upper armature and back contact of relay CTR (Fig. 2), the tip conductor $T_1$ of plug $CCP_1$ and the corresponding terminal of the test connector $TC_1$ (Fig. 5), the lower winding of relay PA and ground.

The operation of relay PA of the test connector $TC_1$ causes the operation of relay PB of the test connector over an obvious circuit completed through the armature and make contact of relay PA. The operation of relay PB connects ground through its upper armature to the sleeve terminal $S_1$. The application of ground to the sleeve terminal $S_1$ of the test connector and the corresponding terminal of the plug $CCP_1$ causes the relay KH to become operated, the completed circuit including battery and the winding of relay KH, conductor $W_4$, the uppermost armature and back contact of relay CTR, the terminal $S_1$ of plug $CCP_1$, and the sleeve terminal $S_1$ of the test connector which is grounded at the upper armature of relay PB. The operation of relay KH signifies that the pulsing circuit has been completed and that the sleeve terminal $S_1$ of the test connector has become grounded. The ground on the sleeve terminal $S_1$ of the test connector also makes the test connector appear busy to any office distributor that may seek access thereto. At the same time the corresponding sleeve terminal $S_1$ of the other test connector $TC_2$ will have ground applied to it over a circuit which may be traced from the ground at the upper armature and back contact of relay CZZ and the sleeve terminal $S_1$ of plug $CCP_2$ to the corresponding sleeve terminal of the test connector $TC_2$.

In response to the operation of relay KH, the relay KV will become operated, the operating circuit including battery, the winding of relay KV, the lower make contact and armature of relay KC, conductor $K_{11}$ and the make contact and armature of relay KH, which is grounded. The operation of relay KH also prepares a locking path for relay KD, the locking path including the grounded upper outer armature and make contact of relay KH, conductor $K_{12}$, and the upper outer armature of relay KD. It will be observed that the make contact of the upper outer armature of relay KD is wired to the upper terminal of the winding of this relay and hence the relay KD will become locked as soon as it becomes operated. The operation of relay KH also causes the relay KJ to be released by opening the circuit to the winding of relay KJ at the back contact of the upper armature of relay KH. The release of relay KJ partially completes an operating path for relay KHH, the latter path extending from the back contact and upper armature of relay KJ, through resistors KZH and KZG to the upper terminal of the winding of relay KHH. It is to be observed also that the operation of relay KH connects battery through the lower armature and make contact of this relay over conductor $K_{21}$ to the feeder brush of arc 3 of the selector KSB. This battery potential applied to the latter feeder brush will be later utilized for operating the "units" lamps $KUL_1$, $KUL_2$ ... $KUL_0$ as the selector KSB is stepped progressively from its terminal No. 12 to its terminal No. 21. The operation of relay KH also partially prepares a locking path for relay KHH through the make contact of the inner upper armature of relay KHH to lock the relay KHH as soon as it becomes operated.

The operation of the relay KV causes the relay KC to be released by opening the circuit at the winding of the latter relay at the back contact of the upper armature of relay KV. It is to be noted that relay KC is of the slow-to-release type and will release only after a predetermined interval of time has elapsed. The operation of relay KV also causes relay KG to become operated over a circuit from ground at the lower armature of relay KV and its make contact, the winding of relay KG and battery. The relay KG, however, has its upper armature and back contact directly in the pulsing circuit which includes conductor $W_6$ and conductor $W_5$, as already pointed out, this circuit controlling the test connector $TC_1$. The operation of relay KG, therefore, opens the pulsing circuit and de-energizes the winding of relay PA of the test connector $TC_1$, causing the relay PA to release. The release of relay PA will energize the vertical magnet PVM of the test connector $TC_1$ over a circuit which extends from ground at the armature of relay PA and its back contact, the lower armature and make contact of relay PB, the normal contacts of off-normal switch PVON, the winding of relay PC, the winding of vertical magnet PVM, battery and ground. This will cause the test connector $TC_1$ to take one vertical step.

The release of the relay KC will break the operating circuit of the stepping magnet KSMB at the make contact of the upper outer armature of relay KC. The release of the stepping magnet KSMB will cause the selector KSB to take one step to its terminal No. 1. The release of relay KC also removes the shunt around the winding of relay KHH previously established at the upper inner armature of relay KC, as already described. The release of relay KC also releases relay KV by opening the circuit in series with the winding of relay KV at the make contact of the lower armature of relay KC. The release of relay KV in turn breaks the circuit through the winding of relay KG at the make contact of the lower armature of relay KV, releasing relay KG. Hence the closure of the back contact of the armature of relay KG will reclose the pulsing circuit previously traced over conductors $W_5$ and $W_6$ to relay PA at the test connector $TC_1$. The relay KD will become operated over a circuit which may be traced from ground at the left swinger of key KST and its normal contact, conductor $K_1$, conductor $K_3$, the lower solid bank segment of selector KSA and its brushes, and its corresponding terminal No. 1, then to terminal No. 1 of arc 6 of the selector KSB and its brushes, the winding of relay KD, battery and ground. It is noted also that with the selector KSB on its terminal No. 1, the relay KON will become operated over a circuit which includes battery, the winding of relay KON, the brushes of arc 2 of the selector KSB, the terminals Nos. 1 to 20 of the same arc—which are connected to each other—and ground. The relay KON will remain operated thereafter as the selector KSB is progressively advanced from its terminal No. 1 to its terminal No. 20.

While the selector KSB is at its terminal No. 1, the relay KT will also be operated over a circuit which includes battery, the winding of relay KT, the brushes of arc 1 of the selector KSB and its terminals Nos. 1 to 10 which are connected to each other and ground. Relay KT will remain operated as the selector KSB is progressively stepped to its terminal No. 10, but relay KT will become released as terminal No. 11 is reached by the selector. Relay KT, when operated, grounds the lower terminal of the winding of relay KE, thereby providing a shunt around the winding of relay KE to prevent its premature operation, as will be subsequently described. The relay KD will be locked in its operated position immediately after it has become operated, the locking path being completed as already described by the closure of the make contact of its upper outer armature. The operation of relay KD will also hold relay KC released by opening the circuit to the winding of relay KC at the back contact of its lower inner armature. The circuit to the winding of relay KC was previously traced through the back contact of the upper armature of relay KV. With relay KC released, the magnet KSMA will remain released and hence the selector KSB will take no other steps. Thus both selectors KSA and KSB will be on their terminals No. 1. In fact, relay KD can be operated only when both selectors KSA and KSB have reached the same terminals, such as No. 1.

The operation of relay KD will also break the circuit to the stepping magnet KSMA of the selector KSA, the circuit being broken at the back contact of the upper inner armature of relay KD. The release of magnet KSMA will prevent any further stepping by the selector KSA. At the same time the operation of relay KD will complete a path to the stepping magnet KSMB of selector KSB, the path including ground at the lower outer armature and make contact of relay KD, the upper outer armature and make contact of relay KON, the brushes of arc 5 of the selector KSB and its terminal No. 1, the back contact and armature of the stepping magnet KSMB and its winding, battery and ground. The energization of the stepping magnet KSMB will attract its armature and break the circuit of this stepping magnet, thereby advancing the selector KSB to its terminal No. 2. Inasmuch as terminals Nos. 2 to 10 on arc 5 of the selector KSB are strapped together, the stepping magnet KSMB will be successively energized and released, advancing the selector KSB to its terminal No. 11. The testing circuit will now be ready for rotary stepping by the test connector $TC_1$.

As selector KSB now is on its terminal No. 11 as already described, the relay KT will then become released by the breakage of the circuit to its winding as the movable brush of the arc 1 of the selector KSB reaches its terminal No. 11. After the necessary release time of relay KT has elapsed and the armature of this relay has opened its make contact to remove the shunt around relay KE, relay KE will then become operated. The operating circuit for relay KE includes battery, resistor KZA, the winding of relay KE, the upper inner armature and back contact of relay KR, terminal No. 11 of arc 6 of the selector KSB and its brushes, the upper outer make contact and armature of relay KD, conductor $K_{12}$, the upper make contact and armature of relay KH and ground. During the interval between the release of relay KT and the operation of relay KE, however, sufficient time will elapse to enable the relay PC of the test connected $TC_1$ to become released, the winding of relay PC being connected in series with the vertical stepping magnet PVM of the test connector, as already noted. The release of the relay PC of the test connector $TC_1$ will now connect the rotary magnet PROT of the test connector to the make contact of the lower armature of relay PB through the back contact and armature of relay PC and lower armature of relay PB through the lower make contacts of the off-normal switch PVON which responds to the operation of the magnet PVM. The rotary magnet PROT, and not the vertical magnet PVM, will now be controlled by the pulses transmitted to the test connector $TC_1$.

The operation of relay KE completes a circuit to the stepping magnet KSMB, the circuit including ground at the upper armature of relay KE and its make contact, conductor $K_5$, the winding of magnet KSMB, battery and ground. The operation of relay KE also causes relay KR to become operated by completing an obvious circuit through the lower armature and make contact of relay KE. The operation of relay KR will cause relay KG to become operated by the completion of an obvious circuit at the make contact of the upper outer armature of relay KR. The operation of relay KG will now perform the same pulsing functions for rotary stepping by the test connector $TC_1$ as were previously performed by this relay for vertical stepping by the test connector.

The operation of relay KR will cause relay KE to be released by opening the circuit in series with the winding of relay KE at the back contact of the upper inner armature of relay KR. The relay CCK of Fig. 2 will now be operated over a path which includes the ground connected to terminals Nos. 1 to 20 of arc 2 of selector KSB and its associated brushes, the lower make contact and armature of relay KR, conductor $W_2$, the winding of relay CCK, battery and ground. The function of relay CCK will be described hereinafter. The release of relay KE also breaks the circuit to the stepping magnet KSMB at the make contact of the upper armature of relay KE. The release of stepping magnet KSMB will cause the selector KSB to advance to its terminal No. 12. On terminal No. 12 the units lamp $KUL_1$ will be illuminated, the circuit for which includes lamp $KUL_1$, terminal No. 12 of arc 3 of selector KSB, together with its brushes, the lower make contact and armature of relay KH, battery and ground. The release of relay KE will also be followed by the release of relay KR by opening the circuit to the winding of relay KR at the make contact of the lower armature of relay KE. The release of relay KR will be followed by the release of relay KG upon opening the circuit of the winding of relay KG at the upper outer make contact and armature of relay KR. With relay KG released, the test connector $TC_1$ will make no further steps at this time but will rest upon the terminals of the first subscriber's line in the first level corresponding to station No. 11, which is the first station of the hundred to be tested. The illumination of both lamps $KL_1$ and $KUL_1$ corresponds to the station that has been seized by the testing apparatus.

The testing apparatus being connected to the subscriber's line No. 11 through the test connector $TC_1$, a momentary ground is transmitted to operate the relay CCK of Fig. 2, as already noted. The operation of relay CCK initiates the testing functions of the apparatus.

The operation of relay CCK causes relay COS to operate over an obvious circuit completed at the make contact of the upper outer armature of relay CCK. The winding of relay CLO is paralleled to the winding of relay COS and hence relay CLO will likewise be operated at this time. The sleeve terminal S of the subscriber's line will now be connected to the relay CBY over a circuit which may be traced from battery, the winding of relay CBY, the lower make contact and armature of relay CCK, the upper outer armature and make contact of relay CLO, the lower innermost armature and back contact of relay CTR to the sleeve terminal S of plug $CCP_1$ and the subscriber's sleeve terminal S to which the latter is connected. If the subscriber's line is busy, ground will be applied to the subscriber's sleeve terminal S which will therefore cause relay CBY to become operated. This will cause the testing apparatus to by-pass the busy subscriber's line and thereby avoid a test of its condition. This is an important feature of the arrangement.

The previous operation of relay CCK as already noted opens the back contact of its inner upper armature which therefore opens the circuit previously traced through the lower inner armature of relay CTR to the sleeve terminal S of the subscriber's line. The back contact of the upper armature of relay CBY is also included in series in this same circuit and this contact is opened in response to the operation of relay CBY when a busy subscriber's line is encountered. The opening of the latter back contact guards against the operation of relay CSL should the subscriber's line become idle following the release of the relay CCK and before the by-pass feature just referred to has had time enough to function. The operation of relay CBY in response to a busy subscriber's line operates relay CBYY by completing an obvious circuit established by the make contact of the lower armature of relay CBY. The relay CBYY then becomes locked in its operated condition, the locking path being completed by the upper armature and make contact of relay CBYY and the back contact and lower armature of relay CCA which is connected to ground. The operation of relay COS connects ground to the upper terminal of the winding of relay CCA through the make contact and lower armature of relay COS, conductor $K_{20}$, and the lower armature and make contact of relay CLO. Ground will therefore be present on both terminals of the winding of relay CCA, providing a shunt circuit to prevent the operation of the latter relay. After relay CCK is fully released, it releases both relays COS and CLO by opening the circuits to their parallel windings at the make contact of the upper outer armature of relay CCK. The release of relays COS and CLO removes the shunt about the winding of relay CCA. The release of relay CCK also releases relay CBY by opening the circuit at the make contact of the lower armature of relay CCK. The release of relay CBY opens the operating circuit of relay CBYY at the lower make contact of relay CBY, but relay CBYY is slow to release.

Now relay CCA is prepared to operate and it does operate. The operating circuit for relay CCA includes battery, the lower armature and make contact of relay CBYY, conductor $K_{21}$, the resistor CZF, the back contact and upper inner armature of relay CLO, the winding of relay CCA and ground. The relay CBYY is sufficiently slow to release so as to insure that relay CCA becomes operated notwithstanding that the locking circuit of relay CBYY is completed through the back contact of the lower armature of relay CCA. The relay KE of Fig. 3 will now be operated in response to the operation of relay CCA over a circuit which may be traced from ground at the lower armature of relay CCA and its make contact, conductor $W_1$, the back contact and inner upper armature of relay KR, the winding of relay KE, resistor KZA and battery. The operation of relay KE starts the cycle of rotary motion controlled generally by selector KSB and the rotary magnet PROT of the test connector TC₁, as already described, to advance the test connector TC₁ one rotary step to the next subscriber's line. If there is no ground on the sleeve terminal S of the subscriber's line previously reached by the test connector TC₁ because the subscriber's line is idle, the pass-by feature causing the operation of relay CBY will not be invoked at this time and the relay CCK will release after a sufficient interval of time has elapsed, thereby causing the testing apparatus to proceed to test the particular subscriber's line reached by the test connector TC₁.

If the subscriber's line is found idle, the operation of the relay CCK will cause the operation of relays CQS and CLO and the completion of a shunt around the winding of the relay CCA, all of which has already been described. The relay CBY will not be operated because no ground is present on the sleeve terminal S of the subscriber's line that has been seized. As the relay CCK subsequently releases, it removes current from the windings of relays CQS and CLO, as already noted. The relay COS, being of the slow release type, allows the relay CSL sufficient time to operate when an idle subscriber's line is seized, as will be explained hereinafter. The relay CSL will then provide a substitute ground completed through the make contact of its lower outermost armature and through the lower armature and make contact of relay CLO to the upper terminal of the winding of relay CCA to hold the winding of relay CCA shunted out of the circuit during the time required to complete the test of the subscriber's line.

In general, it may be stated that the testing apparatus of this invention is arranged to recognize and respond to different conditions on the sleeve terminal of a subscriber's line seized by the apparatus. An idle subscriber's line will have battery on its sleeve terminal and will cause relay CSL to operate. That idle subscriber's line will then be tested by the apparatus of this invention in the normal way. A busy subscriber's line will have ground on its sleeve terminal and will cause relay CBY to operate. The busy subscriber's line will then be passed by. A vacant subscriber's line will ordinarily be connected to an intercept trunk which is made busy by grounding its sleeve. A vacant subscriber's line will also cause relay CBY to operate and hence such a line will be passed by. If an open sleeve of a regular connector is encountered, there will be neither battery nor ground on the sleeve and neither relay CSL nor CBY will operate. The testing apparatus will then stop, but the trouble indicating apparatus will not operate. The number of the line may be noted by the attendant who may then operate key CKCA to pass that line by. If an open sleeve of a level hunting connector is encountered, key CKOS will be closed. As there is no battery or ground on the sleeve, relay CCA will operate and the line will be passed by.

After the testing apparatus has stopped the attendant may operate the key CKCA to proceed with the test on the next subscriber's line, as already pointed out. The operation of relay CCK with key CKCA operated will in turn operate relay CCA over a circuit completed form battery at the right swinger of key CKCA and its make contact, resistor CZF, the back contact and upper inner armature of relay CLO, the winding of relay CCA and ground. The operation of relay CCA will cause the test connector TC₁ to advance to the next subscriber's line.

After an idle subscriber's line has been reached, and relay CCK has been released, current will traverse the upper winding of relay CSL. This circuit may be traced from ground, through the upper winding of relay CSL, the upper armature and back contact of relay CBY, the back contact and upper inner armature of relay CCK, the upper outer armature and make contact of relay CLO, the lower innermost armature and back contact of relay CTR to the sleeve terminal S of plug CCP₁ and the sleeve terminal S of the subscriber's line. The presence of battery on the sleeve terminal S of an idle subscriber's line will result in the operation of relay CSL. The relay CSL will then be locked in its operated position, the locking path including battery, the lower winding of relay CSL, the lower innermost armature and make contact of relay CSL, the back contact and upper armature of relay CCA and ground. The winding of the subscriber's cut-off relay (not shown) will be connected in series with the upper winding of relay CSL and will therefore be operated simultaneously with relay CSL. The operation of the cut-off relay will remove the central office battery from the subscriber's line so that the line may be tested free from any effect due to this battery.

The operation of the relays CSL and CLO places a shunt around the winding of the relay CCA, to prevent the advance of the test connector TC₁ to the next subscriber's line. The shunt path is established through the outermost lower make contact and armature of relay CSL, the lower armature and make contact of relay CLO, to the upper terminal of the winding of relay CCA, the lower terminal of the winding of relay CCA being grounded. This will prevent the operation of relay CCA as long as relay CLO remains operated. The operation of relay CSL will simultaneously operate relays CVR and CVRR, the windings of which are connected in parallel relationship and are controlled in common by the second lower armature and make contact of relay CSL. Relay CVRR is of the slow operate type and hence ground at the make contact of the second lower armature of relay CSL will be momentarily connected to the stepping magnet TSM of the selector TM of Fig. 4. The circuit extending to the stepping magnet TSM includes ground at the make contact of the second lower armature of relay CSL, the upper armature and back contact of relay CVRR, the sleeve terminal of plug CB and jack TB, the brushes of arc 5 of the selector TS, the back contact and armature of the stepping magnet TSM and its winding, and battery. As soon as the magnet TSM is energized, its circuit is then broken to advance the brushes of the selector TS to their terminal No. 2. This will start the cycle for testing the subscriber's line in the manner already referred to with respect to Fig. 1.

The relays CLO and COS will be held operated from ground at arc 4 of the selector TS, the holding circuit including the ring terminals of jack TA and plug CA, the left swinger and normal contact of key CKCA, conductor K₂₂, this conductor being connected in parallel relationship to the windings of both relays COS and CLO and the batteries connected thereto. By holding relays COS and CLO operated, the relay CCA will remain shunted out of the circuit as already explained, and hence the test connector TC1 will be unable to advance during the cycle in which the seized subscriber's line is being tested. The operation of relay CSL will also be accompanied by the shunting of its upper winding, the shunt circuit extending from the lower terminal of the upper winding of relay CSL, through the upper armature and back contact of relay CBY, the back contact and upper inner armature of relay CCK, the upper outer armature and make contact of relay CLO, the lower innermost armature and back contact of relay CTR to the sleeve terminal S of plug CCP1 and the corresponding sleeve terminal S of the subscriber's line. This shunt circuit will hold relay CSL under control of relay CCA, the relay CSL remaining operated as long as relay CCA remains released. In this regard it is to be noted that the lower winding of relay CSL is connected through its innermost armature and make contact to the back contact of the upper armature of relay CCA and to ground, so that the control of relay CSL by relay CCA is governed by whether the relay CCA is released. The operation of relay CSL also connects ground through its uppermost armature and make contact to the sleeve S of plug CCP1 and to the corresponding sleeve terminal S of the subscriber's line for holding the cut-off relay (not shown) in the subscriber's line circuit operated. This will insure the removal of the central office battery from the line as well as the removal of ground from the tip and ring terminals T and R of the subscriber's circuit as is well understood.

The operation of the relay CSL also completed a circuit to the tip and ring terminals T and R of the subscriber's line to be tested. The tip terminal T of the subscriber's line may be traced through the terminal T of the plug CCP1, through the back contact and second lower armature of relay CTR, the second upper make contact and armature of relay CSL, the normal left contact of key CKTR, the tip terminal of plug CB, the tip terminal of jack TB, the brushes of arc 1 of selector TS and its terminal No. 2, the make contacts of switch TO (which may be assumed to be operated), resistor TZK and ground. The ring terminal R may be traced through the back contact and lowermost armature of relay CTR, the make contact and innermost upper armature of relay CSL, the normal make contacts of key CKTR, the ring terminals of plug CB and jack TB, the brushes of arc 2 of selector TS to its terminal No. 2 and ground. The tip and ring circuits correspond to the like circuits previously described in connection with Fig. 1.

If the subscriber's line being tested meets the required conditions, the selector TS will be advanced to its terminal No. 9 in the manner already fully described with respect to Fig. 1. However, when the movable brush of arc 4 of selector TS reaches its terminal No. 9, the holding circuit for relays CLO and COS previously described will be opened at terminal No. 9 of this arc. Upon the release of relay CLO the shunt path around the winding of relay CCA will be opened at the lower make contact of relay CLO and the relay CCA will become operated. The operating circuit for relay CCA may be traced from ground through the winding of relay CCA, the upper inner armature and back contact of relay CLO, resistor CZF, the make contact and armature of relay CVR and battery. The operation of the relay CCA will now provide ground through its lower armature and make contact to actuate the relay KE, the operating circuit including the latter contacts of relay CCA, conductor W1, the inner upper back contact and armature of relay KR, the winding of relay KE, resistor KZA, battery and ground. Relay KE operated causes relay KR to operate as well as magnet KSMB to be energized to advance selector KSB to terminal No. 13. The operation of relay KR causes relay KG to operate as already described. Relay KG opens the pulsing circuit of relay PA of the test connector TC1 to release relay PA. This will be accompanied by the operation of the rotary magnet PROT over a circuit extending through the armature and back contact of relay PA, the armature and make contact of relay PB, the lower make contacts of switch PVON, the armature and back contact of relay PC, magnet PROT and battery. The operation of magnet PROT will advance the test connector TC1 to the next subscriber's line which will be No. 12. This will be accompanied by the illumination of lamps KL1 and KUL2. The operation of relay CCA will also break the circuit of the lower winding of relay CSL at the back contact of the upper armature of relay CCA and this will result in the release of relay CSL. The release of relay CSL will be accompanied by the release of relays CVR and CVRR by opening the circuit to the windings of both of these relays at the make contact of the second lower armature of relay CSL. The release of relay CVR will be accompanied by the release of relay CCA, the circuit previously traced to relay CCA being opened at the make contact of relay CVR. The release of relay CSL will open the circuits previously traced through the second upper armature and the innermost upper armature, respectively, of relay CSL to the tip and ring terminals T and R of the subscriber's line already tested. The release of relay CSL will also remove ground from the subscriber's sleeve S at the contact of the outermost upper armature of relay CSL, thereby releasing the cut-off relay in the subscriber's line circuit. This circuit having previously been described need not be repeated.

If the subscriber's line is found to have an insufficient amount of insulation resistance to ground, for example, the relay CAL will then be operated. The circuit of relay CAL may be traced from battery and the make-before-break contacts of relay TP (the latter relay being now released due to the faulty condition of the subscriber's line as pointed out in regard to Fig. 1), the tip terminals of jack TA and plug CA the winding of relay CAL, conductor K38, the left normal contacts of key CKCA, the ring terminals of plug CA and jack TA, the brushes of arc 4 of selector TS and its terminals Nos. 2, 3 and 4 which are grounded. The operation of relay CAL will be accompanied by the illumination of lamp CTBL and the buzzer CBZ so as to provide visual and audible indications to the attendant that the subscriber's line under test has been found defective. The attendant may record the number of the subscriber's line involved in difficulty and then advance the testing apparatus to the next subscriber's line by momentarily operating the key CKCA. The breakage of the left normal contact of key CKCA will interrupt the holding circuits of relays COS and CLO. The closure of the right make contact of key CKCA will operate relay CCA, the operating circuit including battery, the right swinger and make contact of key CKCA, resistor CZF, the back contact and upper inner armature of relay CLO, the winding of relay CCA and ground. The operation of relay CCA will be accompanied by the stepping of selector KSB to its next terminal and the operation of the rotary magnet PROT of the test connector TC₁ to advance the testing apparatus to the next subscriber's line to be tested.

Figure 4:
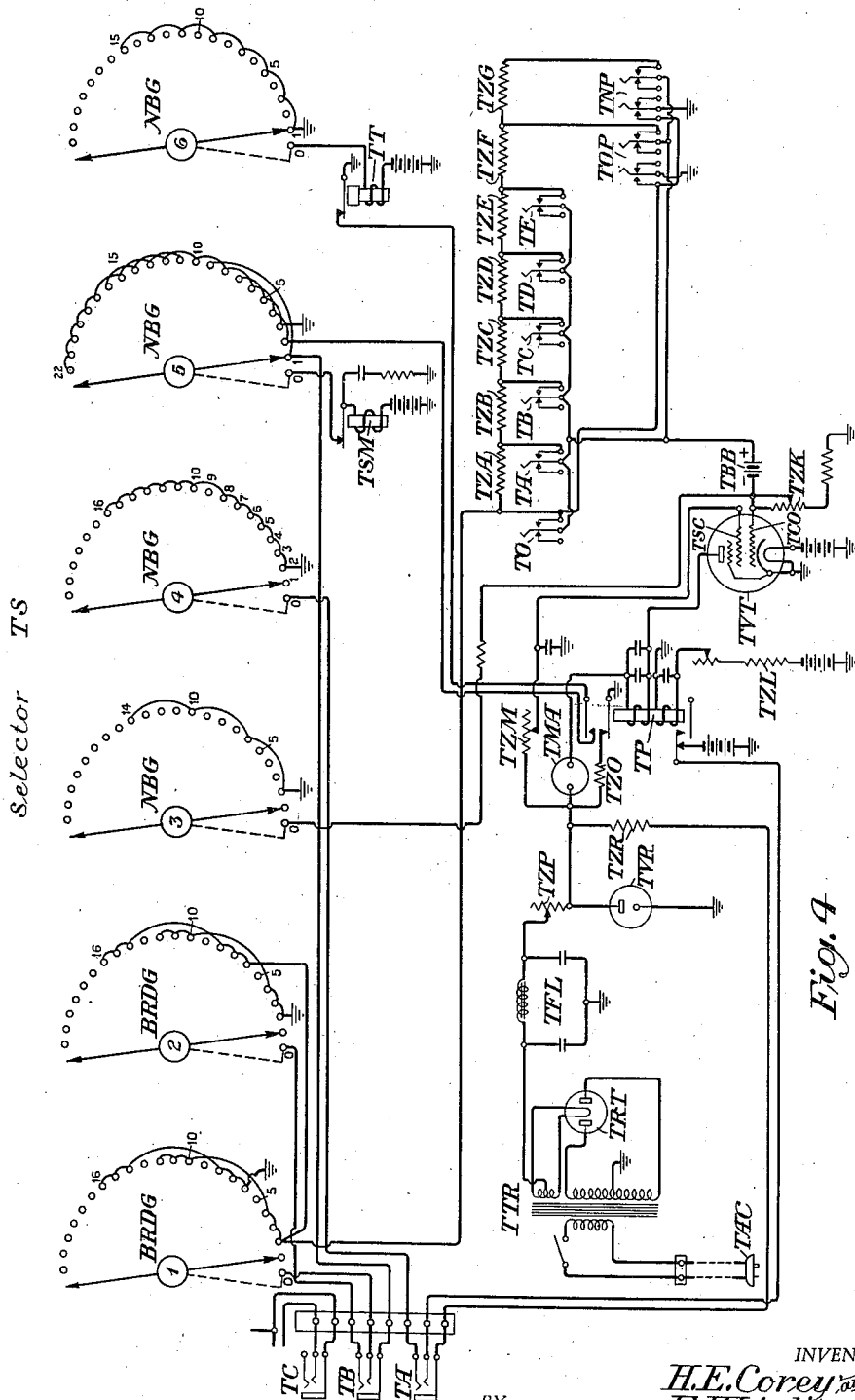

The circuit of Fig. 4 shows more of the equipment used in the cycle for testing any particular line after it has been seized than does Fig. 1. The plug TAC may be inserted into the ordinary A. C. power supply to energize the primary winding of transformer TTR. The upper secondary winding of this transformer furnishes current for the filament of the tube TRT. The lower secondary winding of transformer TTR is connected to the anodes of the tube TRT, the midpoint of the secondary winding being grounded. The rectified current will flow over a circuit including ground, the two halves of the lower secondary transformer winding, the two spare paths of the tube TRT, the upper secondary winding of the transformer TTR, the low pass filter TFL, the resistor TZP, meter TMA, the upper winding of relay TP and the anode and cathode electrodes of the tube TVT, the cathode being grounded. The latter tube is of the pentode type. The voltage regulator tube TVR is bridged across the filter TFL and assists in maintaining a substantially constant unidirectional voltage. The rectified current may be transmitted through resistor TZR to the sleeve terminal of jack TA and this current may be employed to operate the manual testing apparatus to be described hereinafter. Some of the rectifying current may be transmitted through the resistor TZO to the back contact and upper inner armature of relay TP. This resistor acts as an artificial load to receive a substantial part of the rectified output of the tube TRT whenever the relay TP has been released. Another resistor TZM supplies some of the rectified potential to the screen grid TSC of the tube TVT and this resistor may be adjusted to fix the normal current traversing the anode and cathode circuit of the tube TVT which includes the upper winding of the relay TP as shown.

The remainder of the apparatus of Fig. 4 is substantially the same as that shown in Fig. 1 and already described. It may be added that the key TOP may be operated and held operated so that current may flow from ground, through resistor TZK, battery TBB, the right swinger and make contact of key TOP, resistors TZF, TZE, TZD, TZC, TZB and TZA, the left make contact and swinger of key TOP back to ground. This current through resistor TZK will impose a negative potential upon the control grid TCO of the tube TVT, thereby controlling the operation of relay TP. The key TNP when operated will increase the resistance in series with resistor TZK to reduce the negative potential applied to the control grid TCO. The resistor TZL is connected to the biasing winding of relay TP. By adjusting resistors TZK and TZL, it is possible to operate or release the relay TP, depending upon whether key TOP or key TNP is operated or released. The steps that are taken by the selector TS of Fig. 4 in testing any particular line need not be further described.

If a manual test of a defective subscriber's line is to be performed, the key CKTR will be operated to connect the tip and ring terminals T and R of the subscriber's line to the voltmeter testing circuit of this arrangement. The operation of relay CKTR provides a path through its outermost left make contacts to the winding of relay CLO to hold the relay CLO operated. In this connection it is to be remembered that the relay CLO will release upon the release of key CKTR after the manual test has been completed, and then the testing procedure will move on to the next subscriber's line in order to test the condition of this line.

With key CKTR operated a test is made for insulation resistance on the ring side of the subscriber's line. A source of rectified potential of substantial magnitude previously described as coming from the resistor TZR through the sleeve terminal of jack TA will be connected to the ring terminal R of the subscriber's line. This circuit may be further traced through the sleeve terminal of plug CA, the normal contacts of key CFE, the voltmeter CVM, the normal left contacts of key CRV, the right make contacts of key CKTR, the innermost upper armature and make contact of relay CSL, the lower outermost armature and back contact of relay CTR to the ring terminal R of plug CCP₁ and the ring terminal R of the test connector TC₁ which extends to the subscriber's line. If ground is present on the ring terminal of the subscriber's line, the voltmeter CVM will be actuated and the deflection of its needle may be noted. The deflection will be a measure of the insulation resistance to ground of the conductor R of the subscriber's line.

To test the tip terminal of the subscriber's line, the key CRV will now be operated. This will connect the same rectified testing voltage to the tip terminal T of the subscriber's line. The circuit may be traced from resistor TZR through the sleeve terminals of jack TA and plug CA, the normal contacts of key CFE, the voltmeter CVM, the left make contacts of key CRV, the left inner make contacts of key CKTR, the second upper armature and make contact of relay CSL, the second lower armature and back contact of relay CTR, to the tip terminal T of plug CCP₁ and the tip terminal T of the test connector TC₁, and hence to the tip terminal of the subscriber's line under investigation. If there is ground on the tip terminal of the subscriber's line, the voltmeter CVM will again be deflected and its deflection should also be noted by the attendant. The meter deflection is likewise proportional to the insulation resistance to ground of the tip conductor of the subscriber's line.

To determine whether or not there is a short circuit between the tip and ring terminals T and R of the line, the key CRV will be released and the key CG operated. The circuit may now be traced from ground through the contacts of key CG, the normal right contacts of key CRV, the left inner make contacts of key CKTR, the second upper armature and make contact of relay CSL, the second lower armature and back contact of relay CKTR, to terminal T of plug CCP₁ and the tip terminal T of the subscriber's line. This circuit will ground the tip terminal T of the line. The direct voltage may be traced to the ring terminal R through resistor TZR, the sleeve terminals of jack TA and plug CA, the normal contacts of key CFE, the voltmeter CVM, the normal left contacts of key CRV, the right make contacts of key CKTR, the innermost upper armature and make contact of relay CSL, the lowermost armature and back contact of relay CTR, to the ring terminal R of plug CCP₁ and the corresponding terminal R of the subscriber's line. With ground applied to the tip terminal of the line and a source of rectified voltage and a meter connected to the ring terminal of the line, a large current will traverse the meter if the tip and ring conductors are short circuited, but practically no current will traverse the meter if there is no short circuit. The deflection of the meter should be noted. The key CG may then be released at the end of this test.

If a fault has been indicated by the testing apparatus causing the operation of relay CAL and the actuation of the indicating devices, but no deflection is noted on the voltmeter CVM during the manual tests performed on the tip conductor T and the ring conductor R and for a short circuit between these conductors, the fault may have disappeared or, on the other hand, the fault may be due to a cross-connection of battery to the line conductors. To determine this, the key CFE may be operated while key CKTR remains operated and the voltmeter CVM will now be connected to observe whether battery is cross-connected to the ring terminal R of the line. The interconnected circuit may be traced to include the make contacts of key CFE, the voltmeter CVM, the left normal contacts of key CRV, the right make contacts of key CKTR, the innermost upper armature and make contacts of relay CSL, the lowermost armature and back contact of relay CTR, and over the ring terminal R of key $CCP_1$ to the ring conductor R of the line. The presence of voltage on the ring terminal R will deflect the voltmeter CVM and its deflection may be noted. While keys CFE and CKTR remain operated, the key CRV may now be operated to test for the cross-connection of battery to the tip terminal T of the subscriber's line. In this case the circuit will be traced from the make contacts of key CFE, the voltmeter CVM, the left make contacts of key CRV, the inner left make contacts of key CKTR, the second upper armature and make contact of relay CSL, the second lower armature and back contact of relay CTR to the tip terminal T of plug $CCP_1$ and the tip terminal T of the subscriber's line. Again any battery on the tip terminal T will deflect the voltmeter CVM. The keys CRV and CFE may then be released.

It will be noted that when key CKTR was first operated it disconnected the subscriber's line conductors T and R from the automatic testing apparatus at its left and right inner break contacts. This action removed the fault which was holding the relay TP unoperated and relay TP therefore reoperates. Closure of the upper outer contacts of the relay TP recloses the operating path of magnet TSM, thereby permitting selector TS to complete its cycle of operation. Thus, the automatic testing apparatus is in proper condition so that when the release of key CKTR takes place, the seizure of the next subscriber's line will be accomplished.

After all of the rotary steps at any one level have been completed, the selector KSB will have been advanced to its terminal No. 22 and relay KON will therefore be released. The relay KHH will then become operated over a circuit which includes battery, the lower armature and make contact of relay KH, conductor $K_{21}$, the brushes of arc 3 of selector KSB, the back contact and armature of relay KJ, resistors KZH and KZG, the winding of relay KHH to ground. The operation of relay KHH opens the pulsing circuit to relay PA of the test connector $TC_1$ previously traced, over conductors $W_5$ and $W_6$ and through the lower armature and back contact of relay KHH and the armature and back contact of relay KG, as already described. This will prevent the re-closure of this pulsing circuit to relay PA even after relay KG becomes released. The operation of relay KHH causes relay KF to become operated through an obvious circuit completed by the outer make contact of relay KHH. The operation of relay KF also maintains the pulsing circuit open. Due to the prolonged period during which the pulsing circuit is now held open, the test connector $TC_1$ will become released. Upon the release of relay PB of the test connector $TC_1$, ground will be removed from its terminal $S_1$ and this in turn will cause relay KH to be released. The release of relay KH will open both the operating and locking paths of relay KHH. The release of relay KH will also be accompanied by the operation of relay KJ upon the closure of the back contact of the upper armature of relay KH. The relay KJ will hold the operating path for relay KHH open. Moreover, the release of relay KHH will open the operating path for relay KF at the make contact of the upper outer armature of relay KHH. At the same time the release of relay KHH will partially close the pulsing circuit through conductors $W_5$ and $W_6$. Relay KF is sufficiently slow to release, however, to insure the complete restoral of test connector $TC_1$ before it recloses the pulsing circuit through conductors $W_5$ and $W_6$. The release of relay KH will also open the locking path to relay KD previously completed through the upper make contact of relay KH and hence relay KD will be released. The release of relay KD will permit relay KC to become operated as already described. The operation of relay KC connects ground through the upper inner armature of that relay to the terminal common to resistors KZH and KZG, thereby placing a shunt about the winding of relay KHH and preventing the latter relay from operating before the selector KSB reaches its terminal No. 1. The release of relay KD completes a circuit to the stepping magnet KSMA of selector KSA, causing the selector KSA to step to its terminal No. 2. The test apparatus is now prepared to take two vertical steps upon the closure of the pulsing circuit in response to the release of relay KF, so as to reseize the test connector $TC_1$. At the same time the relay KH will be operated upon the application of ground to sleeve terminal $S_1$ through conductor $W_4$.

This same sequence will be followed for each level of the test connector $TC_1$. The advance of the selector KSA to its terminal No. 2 permits one additional pulse to be produced for vertically stepping the test connector $TC_1$ two steps before relay KD operates to arrest the vertical stepping. The advance of selector KSA to terminal No. 3 will likewise advance the test connector $TC_1$ three steps before relay KD operates to arrest vertical stepping, etc. When testing on the ninth level is completed, the relay KD will be released to energize magnet KSMA so as to advance the selector KSA to its terminal No. 10. When terminal No. 10 is reached, relay KKA will become operated over a circuit which includes battery, the winding of relay KKA, terminal No. 10 of the lower bank of selector KSA and its brushes, conductor $K_3$, conductor $K_1$, the left normal contact of key KST and ground. The relay KKA will then be locked in its operated position, the locking circuit including the lower armature and make contact of relay KKA, the inner upper make contact and armature of relay KON and ground. With relay KON still operated, the release magnet KRLS will now be energized, the circuit for which includes battery, the winding of release magnet KRLS, the upper make contact and armature of relay KKA, the inner upper make contact and armature of relay KON and ground. After the selector KSB takes ten steps over the operating path provided by terminals Nos. 1–10 of arc 5 of this selector to the winding of magnet KSMB, the relay KD will become operated. The circuit to the winding of relay KD will be completed through the brushes of arc 6 of selector KSB and its terminal No. 10 which is grounded. The stepping magnet KSMA of selector KSA will be released upon the opening of the inner upper back contact of relay KD. When this happens, the release magnet KRLS will become effective and the selector KSA will be restored to its normal position. The lamp KLo will then become illuminated, the circuit for lamp KLo being traced from ground at the normal left contacts of key KST, conductor K₁, the left normal contacts of key KRON, lamp KLo and battery. When the selector KSB leaves its terminal No. 20 after the completion of tests of subscribers' lines on the 10th level, relay KON will be released. The release of relay KON will release relay KKA by breaking the locking circuit of relay KKA at the upper inner make contact of relay KON. The release of relay KKA will in turn deenergize the release magnet KRLS of selector KSA.

Fig. 2 shows two plugs CCP₁ and CCP₂ connected respectively to test connectors TC₁ and TC₂ of Fig. 5. These are arranged for connection to the subscribers' lines associated with test connector TC₂ after all of the subscribers' lines associated with test connector TC₁ have been tested. The subscribers' lines controlled by test connector TC₂ will be reached only after tests on the subscribers' lines controlled by test connector TC₁ have been completed. After the tests have been completed on the lines reached through test connector TC₁, the attendant may advance the plug CCP₁ to another test connector (not shown) while the tests are still in progress on the subscribers' lines controlled through test connector TC₂.

Upon the completion of tests on the last subscriber's line of test connector TC₁, the relays KHH and KF will become successively operated as already described. The operation of relay KF will result in the operation of relay CZZ, the circuit of which may be traced from ground at the left normal contacts of key KST, conductor K₁, the left normal contacts of key KRON, the lower make contact and armature of relay KF, conductor W₃, the make-before-break contacts of relay CZZ, the winding of the latter relay, the lower half of resistor CZD and battery. Although the winding of relay CZ appears to be in parallel with the winding of relay CZZ, the relay CZ will not become operated at this time because its winding is shunted out by resistor CZD and the winding of relay CZZ. The relay CZZ will be locked in its operated position, the locking circuit being established at the lower make contact and armature of relay CZZ. The operation of relay CZZ will remove the connection of ground through the back contact of its upper armature to terminal S₁ of plug CCP₂. The removal of this ground releases the busy connection on the test connector TC₂. The operation of relay CZZ will be accompanied by the operation of relay CTR over an obvious circuit completed through the upper make contact and armature of relay CZZ. The operation of relay CTR then transfers all of the control leads from the plug CCP₁ and its associated test connector TC₁ to the plug CCP₂ and its associated test connector TC₂. Upon the subsequent release of relay KF, the operating circuit of relay CZZ is opened, but relay CZZ remains operated. Relay CZ now operates over a circuit which may be traced from battery, the upper half of resistor CZD, the winding of relay CZ, the lower make contact and armature of relay CZZ and ground. The operation of both relays CZ and CZZ connects ground to terminal S₁ of plug CCP₁ over a path from ground at the upper armature and make contact of relay CZZ, the upper armature and make contact of relay CZ, to the sleeve terminal S₁ of plug CCP₁. This ground will make any other test connector test busy as soon as it becomes connected to plug CCP₁.

When all subscribers' lines reached through test connector TC₂ have been tested, the relay CZ will remain operated, but the winding of relay CZZ will be shunted out. This will occur as soon as ground over conductor W₃ is extended through the lower armature and make contact of relay CZ to the lower terminal of resistor CZD. This grounded path will receive all of the current previously supplied to the winding of relay CZZ. Relay CZZ will therefore release. Relay CZ will be held operated, however, by ground furnished through the make-before-break contacts of relay CZZ and conductor W₃. The release of relay CZZ will be followed by the release of relay CTR by opening the circuit to the winding of relay CTR at the upper make contact of relay CZZ. The busy ground on terminal S₁ of plug CCP₁ will also be removed. The release of relay CTR will transfer all leads back to plug CCP₁. Moreover, the release of relay KF will open the holding circuit of relay CZ, and hence relay CZ will release. The testing operations will now proceed over the next test connector now connected to plug CCP₁.

It will be clear that the testing apparatus of this invention may be employed for other purposes than for testing subscribers' lines. The testing apparatus may be used for testing cable pairs to detect incipient cable troubles, for example. During periods when there are storms, or threats of storms, for instance, the apparatus may be used to test and re-test the various cable pairs to detect cable failures at the earliest possible moment.

Although relay TP has been described as a polar relay, it will be understood that this relay may be a differential relay which releases when the current in the upper winding is reduced to comparable magnitude with that in the lower winding and the circuit will operate in the same manner as described.

While this invention has been shown and described in certain particular embodiments merely for illustrative purposes, the general features of this invention may be applied to other and widely varied organizations without departing from the spirit of the invention and the scope of the appended claims.

What is claimed is:

1. In a testing system for testing a line having tip and ring conductors, the combination of a plurality of series-connected resistors, a battery, a control resistor connected in series with one terminal of the tip conductor of the line, said battery, and said series-connected resistors; a translating device which is connected across said control resistor and is actuated when the voltage across said control resistor exceeds a predetermined value, and means for shunting any group of said series-connected resistors out of said series circuit, whereby the translating device will determine whether the insulation resistance to ground of the tip conductor exceeds a predetermined value.

2. In a testing system for testing a line having tip and ring conductors, the combination of a plurality of series-connected resistors, a battery, a control resistor, means for connecting one terminal of the ring conductor to ground and one terminal of the tip conductor in series with said battery, said control resistor, and said series-connected resistors, a translating device which is actuated when the voltage across said control resistor exceeds a predetermined value, means for shunting any group of said series-connected resistors out of said series circuit, whereby the testing system will determine whether the insulation resistance to ground of the tip conductor exceeds a predetermined value.

3. In a testing system, the combination of a line having tip and ring conductors, a plurality of series-connected resistors, a battery, a control resistor, means for connecting the ring conductor to ground and the tip conductor in series with said battery, said control resistor, and said series-connected resistors, a vacuum tube including anode, cathode and control electrodes, the control electrode of said vacuum tube being connected to said control resistor, a translating device connected between the anode and cathode electrodes of said tube, said translating device being actuated when the voltage across the control resistor exceeds a predetermined value, and means for shunting any number of said series-connected resistors out of said series circuit, whereby the testing system will determine whether the insulation resistance to ground of the tip conductor exceeds a predetermined value.

4. In a testing system, the combination of a line having tip and ring conductors, a step-by-step selector, a source of voltage, an adjustable resistor, a control resistor, a translating device connected to said control resistor and actuated when the voltage across said control resistor exceeds a predetermined value, said selector being included in series circuit with said source of voltage, said adjustable resistor and said control resistor, means for stepping said selector so as to connect the tip conductor to said series circuit and the ring conductor to ground and for operating said translating device when the insulation resistance to ground is less than a predetermined value, and means for stepping said selector so as to connect the ring conductor to said series circuit and the tip conductor to ground so as to operate said translating device when the insulation resistance to ground of the ring conductor is less than said latter predetermined value.

5. In a testing system, the combination of a line having tip and ring conductors, a step-by-step selector, an adjustable resistor, a source of voltage, a control resistor, means for connecting said adjustable resistor in a series circuit with said selector, said source of voltage, and said control resistor, a translating device connected to said control resistor and actuated when the voltage across said control resistor is below a predetermined value, means for stepping said selector so as to connect the tip conductor to said series circuit and the ring conductor to ground so that said translating device will be actuated when the insulation resistance to ground of the tip conductor is below a predetermined value, and means for stepping said selector so as to connect the ring conductor to said series circuit and the tip conductor to ground so that the translating device will be actuated when the insulation resistance to ground of the ring conductor is below the latter predetermined value, said predetermined value being determined by the magnitude of said adjustable resistor included in the series circuit.

6. In a testing system, the combination of a line having tip and ring conductors, a step-by-step selector, a source of voltage, a control resistor connected to said selector and said source of voltage, a translating device connected across said control resistor, said translating device being actuated when the voltage across said control resistor exceeds a predetermined value, means for stepping said selector so as to simultaneously connect the tip conductor and the ring conductor to said control resistor and source of voltage so as to determine whether the insulation resistance of said tip conductor is below a predetermined value, and means for stepping said selector so as to reverse the positions of said tip and ring conductors relative to said control resistor and source of voltage so as to determine whether the insulation resistance of said ring conductor is below the latter predetermined value.

7. In a testing system, the combination of a line having tip and ring conductors, a step-by-step selector, a control resistor connected to said selector, a source of voltage, a vacuum tube having an anode, cathode and control electrodes, the control electrode of said tube being connected to said control resistor, a translating device connected to the anode and cathode electrodes of said tube, and means for successively stepping said selector so as to separately connect said tip and ring conductors of said line to said control resistor through said source of voltage, whereby said translating device may be actuated to determine whether the insulation resistance of said conductors is below a predetermined value.

8. In a testing system, the combination of a line having tip and ring conductors, a step-by-step selector, a control resistor connected to said selector, a vacuum tube having an anode, cathode and control electrodes, the control electrode of said tube being connected to said control resistor, a translating device connected to the anode and cathode electrodes of said tube, means for successively stepping said selector so as to separately connect the tip and ring conductors of said line to said control resistor, and means responsive to the operation of said translating device to prevent further operation of said selector.

9. In a testing system, the combination of a line having tip and ring conductors, a source of voltage, a vacuum tube having an anode, cathode and control electrodes, a relay having its winding in circuit with the anode and cathode electrodes of said tube, a resistor connected between said control and cathode electrodes of said tube, a step-by-step selector, and means to progressively step said selector so as to establish a path including said source of voltage, said resistor and one of the conductors of said line, said relay being actuated when the insulation resistance to ground of the conductor in said path is below a predetermined value.

10. In a testing system, the combination of a line having tip and ring conductors, a source of voltage, a vacuum tube having anode, cathode and control electrodes, a relay having its winding in circuit with said anode and cathode electrodes, a resistor connecting between said control and cathode electrodes, a step-by-step selector, means to step said selector to establish a series path including said source of voltage, said resistor and the tip conductor of said line, means to step said selector to establish a series path including said source of voltage, said resistor and the ring conductor of said line, said relay being actuated when the insulation resistance to ground of the conductor of the line included in said series path is below a predetermined value, and means for changing the magnitude of the resistance in the series path to correspondingly vary said predetermined value.

11. In a testing system, the combination of a line having tip and ring conductors, a source of voltage, a vacuum tube having anode, cathode and control electrodes, a relay having its winding in circuit with said anode and cathode electrodes, a resistor connecting between said control and cathode electrodes, a step-by-step selector, means to step said selector to establish a path including said source of voltage, said resistor and the tip conductor of said line, means to step said selector to establish a path including said source of voltage, said resistor and the ring conductor of said line, said relay being actuated when the insulation resistance to ground of conductor of the line included in said path is below a predetermined value, and means responsive to the actuation of said relay to prevent further stepping by said selector.

12. In an automatic testing system, the combination of a plurality of subscribers' lines to be tested, each line having tip and ring conductors, a relay, a selector connected to said relay, means controlled by said selector for connecting the tip conductor of a selected line to said relay and its ring conductor to ground to actuate said relay when the insulation resistance to ground of the tip conductor is below a predetermined value, and means controlled by said selector for connecting the ring conductor of the selected line to said relay and its tip conductor to ground to actuate said relay when the insulation resistance to ground of the ring conductor is below said predetermined value.

13. In an automatic testing system, the combination of a plurality of subscribers' lines to be tested, each line having tip and ring conductors, a relay, a selector connected to said relay, means controlled by said selector for connecting the tip conductor of a selected line to said relay and its ring conductor to ground to actuate said relay when the insulation resistance to ground of the tip conductor is below a predetermined value, means controlled by said selector for connecting the ring conductor of the selected line to said relay and the tip conductor to ground to actuate said relay when the insulation resistance to ground of the ring conductor is below said predetermined value, and means controlled by said selector for actuating said relay when there is a short-circuit between the tip and ring conductors of the selected line.

14. In an automatic testing system, the combination of a plurality of subscribers' lines to be tested, each line having tip and ring conductors, a relay, a selector connected to said relay, means controlled by said selector for connecting the tip conductor of a selected line to said relay and its ring conductor to ground to actuate said relay when the insulation resistance to ground of the tip conductor is below a predetermined value, means controlled by said selector for connecting the ring conductor of the selected line to said relay and its tip conductor to ground to actuate said relay when the insulation resistance to ground of the ring conductor is below said predetermined value, and means controlled by said selector and said relay and responsive to the non-actuation of said relay to select another line and connect said relay with said other line so that it may be tested, said relay being actuated also when there is a short-circuit between the tip and ring conductors of any selected line.

15. In an automatic testing system, the combination of a plurality of subscribers' lines to be tested, each line having tip and ring conductors, a relay, a selector connected to said relay, means controlled by said selector for connecting the tip conductor of a selected line to said relay and its ring conductor to ground to actuate said relay when the insulation resistance to ground of the tip conductor is below a predetermined value, means controlled by said selector for connecting the ring conductor of the selected line to said relay and its tip conductor to ground to actuate said relay when the insulation resistance to ground of the ring conductor is below said predetermined value, and means responsive to the actuation of said relay to prevent the further operation of said selector.

16. In an automatic testing system, the combination of a plurality of subscribers' lines to be tested, each line having tip and ring conductors, a relay, a selector connected to said relay, means controlled by said selector for connecting the tip conductor of a selected line to said relay and its ring conductor to ground to actuate said relay when the insulation resistance to ground of the tip conductor is below a predetermined value, means controlled by said selector for connecting the ring conductor of the selected line to said relay and its tip conductor to ground to actuate said relay when the insulation resistance to ground of the ring conductor is below said predetermined value, means controlled by said selector for actuating said relay when there is a short-circuit between the tip and ring conductors of the selected line, and means responsive to the actuation of said relay to prevent further operation of said selector.

17. In a testing system, the combination of a telephone line having tip and ring conductors to be tested, a step-by-step selector, a relay connected to said selector, means to step said selector so as to connect the tip conductor of the line to said relay and the ring conductor to ground so that said relay will be actuated if the insulation resistance between the tip conductor and ground is below a predetermined value, means to step said selector so as to connect the ring conductor to said relay and the tip conductor to ground so that said relay will be actuated if the insulation resistance between the ring conductor and ground is below said predetermined value, and means responsive to the application of a cross-potential to either tip conductor or ring conductor to actuate said relay.

18. In a testing system for a telephone line to determine whether voltage has been cross-connected to said line, comprising a source of voltage connected to said line and poled so as to be additive to any cross-connected voltage on said line, a resistor connected in series with said source of voltage and said line, and a translating device connected across said resistor and actuated when the voltage across said resistor exceeds a predetermined value.

HORACE EDMUND COREY.
FRANK WRIGHT.